United States Patent [19]

Shelestak et al.

[11] Patent Number: 5,688,727
[45] Date of Patent: Nov. 18, 1997

[54] INFRARED AND ULTRAVIOLET RADIATION ABSORBING BLUE GLASS COMPOSITION

[75] Inventors: Larry J. Shelestak, Bairdford; David R. Haskins, Gibsonia, both of Pa.

[73] Assignee: PPG Industries, Inc., Pittsburgh, Pa.

[21] Appl. No.: 664,942

[22] Filed: Jun. 17, 1996

[51] Int. Cl.$^6$ .................................................. C03C 3/087
[52] U.S. Cl. .................................................. 501/71; 501/70
[58] Field of Search ............................................ 501/70, 71

[56] References Cited

U.S. PATENT DOCUMENTS

| | | | |
|---|---|---|---|
| Re. 25,312 | 1/1963 | Duncan et al. | 501/71 |
| Re. 34,639 | 6/1994 | Boulos et al. | 501/71 |
| Re. 34,670 | 7/1994 | Boulos et al. | 501/71 |
| 1,737,685 | 12/1929 | Rising | 501/65 |
| 1,737,686 | 12/1929 | Rising | 501/69 |
| 1,924,752 | 8/1933 | Rising | 501/65 |
| 2,144,943 | 1/1939 | Sharp et al. | 501/70 |
| 2,397,195 | 3/1946 | Mook et al. | 501/58 |
| 2,755,212 | 7/1956 | Brown | 501/17 |
| 3,024,120 | 3/1962 | Babcock | 501/17 |
| 3,024,121 | 3/1962 | Hagedorn | 501/71 |
| 3,206,659 | 9/1965 | Goodman et al. | 361/280 |
| 3,330,638 | 7/1967 | Brown | 65/134.3 |
| 3,498,806 | 3/1970 | Hammer et al. | 501/71 |
| 3,523,779 | 8/1970 | Keshari et al. | 65/134.3 |
| 3,652,303 | 3/1972 | Rao | 501/56 |
| 3,672,919 | 6/1972 | Sack | 501/59 |
| 3,779,733 | 12/1973 | Rao | 65/32.5 |
| 4,104,076 | 8/1978 | Pons | 501/66 |
| 4,381,934 | 5/1983 | Kunkle et al. | 65/135.4 |
| 4,713,359 | 12/1987 | Lubelski et al. | 501/63 |
| 4,792,536 | 12/1988 | Pecoraro et al. | 501/70 |
| 4,866,010 | 9/1989 | Boulos et al. | 501/71 |
| 4,886,539 | 12/1989 | Cerutti et al. | 65/134.2 |
| 5,013,487 | 5/1991 | Cheng | 252/587 |
| 5,023,210 | 6/1991 | Krumwiede et al. | 501/71 |
| 5,069,826 | 12/1991 | Cheng | 252/587 |
| 5,070,048 | 12/1991 | Boulos et al. | 501/71 |
| 5,264,400 | 11/1993 | Nakaguchi et al. | 501/71 |
| 5,278,108 | 1/1994 | Cheng et al. | 501/71 |
| 5,308,805 | 5/1994 | Baker et al. | 501/71 |
| 5,344,798 | 9/1994 | Morimoto et al. | 501/70 |
| 5,346,867 | 9/1994 | Jones et al. | 501/71 |
| 5,364,820 | 11/1994 | Morimoto et al. | 501/71 |
| 5,380,685 | 1/1995 | Morimoto et al. | 501/71 |
| 5,393,593 | 2/1995 | Gulotta et al. | 428/220 |
| 5,411,922 | 5/1995 | Jones | 501/71 |
| 5,478,783 | 12/1995 | Highby et al. | 501/27 |
| 5,545,596 | 8/1996 | Alvarez-Casariego et al. | 501/71 |
| 5,582,455 | 12/1996 | Casariego et al. | 296/146.2 |

*Primary Examiner*—Mark L. Bell
*Assistant Examiner*—David Sample
*Attorney, Agent, or Firm*—Andrew C. Siminerio

[57] ABSTRACT

The present invention provides a blue colored glass using a standard soda-lime-silica glass base composition and additionally iron and cobalt as solar radiation absorbing materials and colorants. In particular, the blue colored glass includes about 0.53 to 1.1 wt. % total iron, preferably about 0.6 to 0.85 wt. % and about 5 to 40 PPM CoO, preferably about 15 to 30 PPM and a luminous transmittance of at least 55%. If desired, the composition may include up to about 100 PPM $Cr_2O_3$. The redox ratio for the glass of the present invention is maintained between about 0.25 to 0.35, preferably between about 0.28 to 0.33. The glass color is characterized by a dominant wavelength (DW) of about 485 to 491 nanometers and an excitation purity (Pe) of about 3 to 18 percent. In one particular embodiment of the invention, the color of the glass is characterized by a dominant wavelength in the range of about 487 to 489 nanometers and an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

38 Claims, No Drawings

INFRARED AND ULTRAVIOLET RADIATION ABSORBING BLUE GLASS COMPOSITION

BACKGROUND OF THE INVENTION

1. Field of the Invention

This invention relates to an infrared and ultraviolet radiation absorbing blue colored soda-lime-silica glass composition suitable for architectural and automotive glazing applications. The glass should have a dominant wavelength of about 485 to 491 nanometers (nm) and an excitation purity of about 3 to 18 percent. The glass is also compatible with flat glass manufacturing methods.

2A. Technical Considerations

Infrared and ultraviolet radiation absorbing colored glass substrates have a variety of different applications. In particular, such glasses may be used by architects to glaze buildings and by vehicle designers as automotive windows. Besides providing an aesthetically pleasing color, these glasses may also provide enhanced solar performance as compared to conventional clear glass.

Different materials may be added to the glass in order to provide the desired color and spectral performance. For example, iron, cobalt, nickel, selenium and titanium, to name a few, are typically added to provide the desired color composition. As materials are added to change color and enhance solar performance, care must be taken to maintain the visible light transmittance and color required for that particular application. It should also be remembered that changing the thickness of the glass will affect these spectral properties so that a particular composition which has acceptable color and performance at a particular thickness may not be acceptable at a different thickness.

One particular blue composition that provides superior spectral performance is disclosed in U.S. Patent No. 4,792,536 to Pecoraro et al. Commercial products which incorporate this patent are sold by PPG Industries, Inc. under the trademarks SOLEXTRA® and AZURLITE®. This glass incorporates a moderate amount of iron in the composition and has a relatively large portion of the glass in the ferrous state, expressed as FeO. In particular, the glass composition includes a basic soda-lime-silica composition and further includes 0.45 to 1 weight percent total iron (expressed as $Fe_2O_3$). At least 35 percent of the total iron is in the ferrous state. The dominant wavelength of these glasses ranges from about 486 to 489 nm and excitation purity ranges from about 8 to 14 percent. From a processing standpoint, producing the glass disclosed in the patent with a high ratio of ferrous iron to total iron may require additional processing considerations not typically associated with conventional glass melting operations, as are well known in the art. However, due to the favorable acceptance of this product, it would be advantageous to be able to produce a glass having a similar color and enhanced spectral performance using conventional glass melting processing techniques.

2B. Patents of Interest

U.S. Pat. No. 3,652,303 to Janakirama Rao discloses a blue, heat absorbing glass which incorporates low amounts of iron and uses tin to convert and retain a significant portion of the iron in the ferrous state, and in particular more than 80% of the iron is retained in the ferrous state.

U.S. Pat. Nos. 4,866,010 and 5,070,048 to Boulos et al. disclose blue glass compositions with a colorant portion consisting essentially of iron and cobalt and further including nickel and/or selenium. The glasses have a dominant wavelength of 482 nanometers (nm)±1 nm and a color purity of 13%±1%.

U.S. Pat. Nos. 5,013,487 and 5,069,826 to Cheng disclose blue colored glass compositions which include iron, titanium, tin and zinc as colorants. The glasses have a dominant wavelength ranging from 485 to 494 nm and a color purity of 5 to 9%.

U.S. Pat. No. 5,344,798 to Morimoto et al. discloses a blue glass composition which includes iron, cerium, titanium, zinc, cobalt and manganese. These glasses have a dominant wavelength of 495 to 505 nm and a color purity of 5 to 9%.

SUMMARY OF THE INVENTION

The present invention provides a blue colored glass using a standard soda-lime-silica glass base composition and additionally iron and cobalt as solar radiation absorbing materials and colorants. In particular, the blue colored glass includes about 0.53 to 1.1 wt. % total iron, preferably about 0.6 to 0.85 wt. % and about 5 to 40 PPM CoO, preferably about 15 to 30 PPM and has a luminous transmittance of at least 55%. If desired, the composition may include up to about 100 PPM $Cr_2O_3$. The redox ratio for the glass of the present invention is maintained between about 0.25 to 0.35, preferably between about 0.28 to 0.33. The glass color is characterized by a dominant wavelength (DW) of about 485 to 491 nanometers and an excitation purity (Pe) of about 3 to 18 percent. In one particular embodiment of the invention, the color of the glass is characterized by a dominant wavelength in the range of about 487 to 489 nanometers and an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.31 5 inches.

DETAILED DESCRIPTION OF THE INVENTION

The base glass composition of the present invention is commercial soda-lime-silica glass characterized as follows:

|  | Weight Percent |
|---|---|
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As used herein, all "weight percent (wt. %)" values are based on the total weight of the final glass composition.

To this base glass, the present invention adds infrared and ultraviolet radiation absorbing materials and colorants in the form of iron and cobalt, and optionally chromium. As disclosed herein, iron is expressed in terms of $Fe_2O_3$ and FeO, cobalt is expressed in terms of CoO, and chromium is expressed in terms of $Cr_2O_3$. It should be appreciated that the glass compositions disclosed herein may include small amounts of other materials, for example melting and refining aids, tramp materials or impurities. It should be further appreciated that in one embodiment of the invention, small amounts of additional materials may be included to color the glass and/or improve its solar performance, as will be discussed later in more detail.

The iron oxides in a glass composition perform several functions. Ferric oxide, $Fe_2O_3$, is a good ultraviolet radiation absorber and operates as a yellow colorant in the glass. Ferrous oxide, FeO, is a good infrared radiation absorber and operates as a blue colorant. The total amount of iron present in the glasses disclosed herein is expressed in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$, the term "$Fe_2O_3$" shall mean iron in the ferric state expressed in terms of $Fe_2O_3$ and the term "FeO" shall mean iron in the ferrous state expressed in terms of FeO.

CoO operates as a blue colorant and a weak infrared radiation absorber in the glass. $Cr_2O_3$ may be added to impart a green color component to the glass composition. In addition, it is believed that the chromium may also provide some ultraviolet radiation absorption. A proper balance between the iron, i.e. ferric and ferrous oxides, and cobalt, and optionally chromium, content is required to obtain a glass with the desired blue color and spectral properties.

The glass of the present invention may be melted and refined in a continuous, large-scale, commercial melting operation and formed into flat glass sheets of varying thickness by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of at least 0.05 wt. % in the first few microns below the surface of the glass that was in contact with the tin.

Although it is preferred that the glass disclosed herein be made using a conventional, overhead fired continuous melting operation, as is well known in the art, the glass may also be produced using a multi-stage melting operation, as disclosed in U.S. Pat. Nos. 4,381,934 to Kunkle et al., 4,792,536 to Pecoraro et al. and 4,886,539 to Cerutti et al. If required, a stirring arrangement may be employed within the melting and/or forming stages of the glass production operation to homogenize the glass in order to produce glass of the highest optical quality.

Tables 1 and 5 illustrate examples of glass compositions which embody the principles of the present invention. PA 1, PA 2 and PA 3 represent prior art blue glasses, Examples 1 to 14 are experimental melts and Examples 15 to 25 are computer modeled compositions generated by a glass color and spectral performance computer model developed by PPG Industries, Inc. Only the iron and cobalt portions of Examples 1 to 14 are listed in the Table 1. Table 5 further includes the chromium content for Examples 15 to 25. Tables 2 to 4 and 6 to 8 list the spectral properties of Examples 1 to 14 shown in Table 1 and Examples 15 to 25 shown in Table 5, respectively, at reference thicknesses of 0.089 inches (2.3 mm), 0.154 inches (3.9 mm) and 0.223 inches (5.5 mm), respectively. With respect to the data provided in Tables 2 to 4, the luminous transmittance (LTA) is measured over the wavelength range 380 to 770 nanometers using the C.I.E. 2° observer and the weighting factors for C.I.E. standard illuminant "A". The solar transmittance (LTS) is measured over the wavelength range of 380 to 770 nm using the C.I.E. 2° observer and the weighting factors specified in ASTM 891-87. Glass color, in terms of dominant wavelength (DW) and excitation purity (Pe), is measured using C.I.E. standard illuminant "C" with a 2° observer, following the procedures established in ASTM E308-90. The total solar ultraviolet transmittance (TSUV) is measured over the wavelength range 300 to 400 nanometers, total solar infrared transmittance (TSIR) is measured over the wavelength range 720 to 2000 nanometers, and total solar energy transmittance (TSET) is measured over the wavelength range 300 to 2000 nanometers. The TSUV, TSIR and TSET transmittance data is calculated using Parry Moon air mass 2.0 direct solar irradiance data and integrated using the Trapezoidal Rule, as is known in the art. The shading coefficient (SC), which is the ratio of the total solar heat gain for a sample to the total solar heat gain of a nominal 3 mm thick (⅛ inch) clear glass reference, is calculated using the Window 4.1 computer program available from Lawrence Berkeley Laboratory. The spectral properties presented in Tables 6 to 8 for the modeled compositions are based on the same wavelength ranges and calculation procedures.

Sample Preparation

Examples 1 to 5—The information provided in Table 1 for Examples 1 to 5 is based on experimental laboratory melts having approximately the following basic batch components:

| | |
|---|---|
| sand | 500 gm |
| soda ash | 162.8 gm |
| limestone | 42 gm |
| dolomite | 121 gm |
| salt cake | 2.5 gm |
| rouge | as required |
| $Co_3O_4$ | as required |

Coal was added to each melt to control redox. In preparing the melts, the ingredients were weighed out and blended in a mixer. Half of the material was then placed in a refractory silica crucible and heated to 2650° F. (1454° C.) for 30 minutes. The remaining material was then added to the crucible and heated to 2650° F. (1454° C.) for 1½ hours. Next, the molten glass was fritted in water, dried and reheated at 2650° F. (1454° C.) for one hour. The molten glass was then fritted a second time in water, dried and reheated to 2650° F. (1454° C.) for two hours. The molten glass was then poured out of the crucible and annealed.

Examples 6 to 9—The information provided in Table 1 for Examples 6 to 9 is based on experimental laboratory melts having approximately the following basic batch components:

| | |
|---|---|
| sand | 260.4 gm |
| soda ash | 82.3 gm |
| limestone | 22.1 gm |
| dolomite | 62.5 gm |
| gypsum | 1.68 to 3.39 gm |
| $Co_3O_4$ | 0.0081 gm |
| rouge | as required |
| SOLEX ® glass cullet | as required |

Carbon containing material was added to the batch material to control the redox level, for example as disclosed in U.S. Pat. No. 4,551,161 to Savolskis et al. SOLEX® glass is a green colored soda-lime-silica glass sold by PPG Industries, Inc. which is used in automotive glazing applications and generally has a total iron content of about 0.52 wt. % and an FeO content of about 0.13 wt. %. In preparing the melts, the ingredients were weighed out and blended in a mixer. The material was then placed in a refractory silica crucible and heated to 2600° F. (1427° C.) for 90 minutes. The molten glass was then poured out of the crucible and annealed.

Examples 10 to 14—The information provided in Table 1 for Examples 10 to 14 is based on experimental laboratory melts having approximately the following basic batch components:

| | |
|---|---|
| SOLEX ® glass cullet | 3000 gm |
| rouge | as required |
| $Co_3O_4$ | as required |

Graphite was added to each melt to control redox. In preparing the melts, the ingredients were weighed out and blended in a mixer. The material was then placed in a platinum—10% rhodium alloy crucible and heated to 2650° F. (1454° C.) for two hours. Next, the molten glass was fritted in water, dried and reheated at 2650° F. (1454° C.) for one hour. The molten glass was then fritted a second time in water, dried and reheated to 2700° F. (1482° C.) for two hours. The molten glass was then poured out of the crucible and annealed.

The chemical analysis of the glass compositions was determined using a RIGAKU 3370 X-ray fluorescence spectrophotometer. The FeO content was determined using spectral analysis or wet chemistry techniques, as are well known in the art. The spectral characteristics of the glass were determined on annealed samples using a Perkin-Elmer Lambda 9 UV/VIS/NIR spectrophotometer prior to tempering the glass or prolonged exposure to ultraviolet radiation, which will affect the spectral properties as will be discussed later.

The following is representative of the basic oxides of the glasses disclosed in Table 1:

| | |
|---|---|
| $SiO_2$ | 72.4 to 74 wt. % |
| $Na_2O$ | 12.9 to 13.7 wt. % |
| $K_2O$ | 0.042 to 0.056 wt. % |

-continued

| | |
|---|---|
| CaO | 8.2 to 9.1 wt. % |
| MgO | 3.5 to 3.9 wt. % |
| $Al_2O_3$ | 0.14 to 0.2 wt. % |

It is expected that the basic oxide constituents of the computer generated glass compositions in Table 5 would be similar.

Although not included in Table 1, Examples 1 to 14 also included from about 5 to 10 PPM $Cr_2O_3$, which at those levels is considered to be a tramp and/or residual level, most likely introduced into the glass composition from the batch raw materials or glass processing equipment. In addition, Examples 1, 3–5 and 10–13 included up to about 39 PPM $MnO_2$ which amount is also considered to be a tramp and/or residual level. Examples 2 and 14 were not analyzed for $MnO_2$. Furthermore, Examples 6 to 9 included 228, 262, 284 and 354 PPM $MnO_2$, respectively. It is believed that these higher levels of $MnO_2$ were due to the particular cullet used in making the samples. Computer generated Examples 15–18, 20 and 22–25 in Table 5 were modeled to include 30 PPM $MnO_2$. Examples 19 and 21 are similar in composition to Example 20 except that they include no $MnO_2$ and 300 PPM $MnO_2$, respectively. $MnO_2$ has been used to help control redox in glass compositions. In the glass compositions disclosed in the present invention, it is believed that the presence of up to about 0.1 wt. % $MnO_2$ will not affect the color or performance of the glass.

TABLE 1

Glass Composition

| | PA 1 | PA 2 | PA 3 | Ex. 1 | Ex. 2 | Ex. 3 | Ex. 4 | Ex. 5 | Ex. 6 |
|---|---|---|---|---|---|---|---|---|---|
| Total Iron (wt. %) | 0.379 | 0.446 | 0.475 | 0.681 | 0.737 | 0.739 | 0.777 | 0.808 | 0.668 |
| $Fe_2O_3$ (wt. %) | 0.273 | 0.336 | 0.338 | 0.465 | 0.475 | 0.485 | 0.548 | 0.532 | 0.455 |
| FeO (wt. %) | 0.097 | 0.100 | 0.123 | 0.196 | 0.238 | 0.231 | 0.208 | 0.251 | 0.194 |
| Redox | $0.256^2$ | $0.224^2$ | $0.259^2$ | $0.288^1$ | $0.323^2$ | $0.313^1$ | $0.268^2$ | $0.311^1$ | $0.290^2$ |
| CoO (PPM) | 14 | 61 | 65 | 15 | 20 | 20 | 32 | 27 | 6 |

| | Ex. 7 | Ex. 8 | Ex. 9 | Ex. 10 | Ex. 11 | Ex. 12 | Ex. 13 | Ex. 14 |
|---|---|---|---|---|---|---|---|---|
| Total Iron (wt. %) | 0.726 | 0.730 | 0.749 | 0.598 | 0.608 | 0.628 | 0.648 | 0.721 |
| $Fe_2O_3$ (wt. %) | 0.504 | 0.512 | 0.516 | 0.409 | 0.391 | 0.409 | 0.418 | 0.472 |
| FeO (wt. %) | 0.202 | 0.198 | 0.212 | 0.172 | 0.197 | 0.199 | 0.209 | 0.226 |
| Redox | $0.278^2$ | $0.271^2$ | $0.283^2$ | $0.288^2$ | $0.324^1$ | $0.317^1$ | $0.323^1$ | $0.313^2$ |
| CoO (PPM) | 17 | 24 | 19 | 22 | 19 | 22 | 25 | 21 |

[1] redox based on spectra analysis
[2] redox based on wet chemical analysis

TABLE 2

Spectral Properties at 0.089 inches (2.3 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| LTA (%) | 79.3 | 76.4 | 77.2 | 75.4 | 75.0 | 78.6 | 77.0 | 75.9 | 77.0 | 79.1 | 79.3 | 78.7 | 77.9 | 76.7 |
| LTS (%) | 80.4 | 77.7 | 78.4 | 76.7 | 76.3 | 79.9 | 78.2 | 77.1 | 78.3 | 80.2 | 80.4 | 79.8 | 79.1 | 78.0 |
| TSUV (%) | 61.2 | 59.9 | 58.6 | 57.5 | 56.8 | 59.9 | 55.8 | 55.3 | 57.1 | 63.8 | 63.7 | 62.9 | 62.2 | 60.0 |
| TSIR (%) | 47.0 | 37.3 | 42.5 | 42.2 | 39.1 | 37.4 | 39.8 | 41.0 | 39.4 | 47.8 | 46.8 | 46.5 | 44.9 | 38.7 |

TABLE 2-continued

Spectral Properties at 0.089 inches (2.3 mm)

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| TSET (%) | 61.9 | 55.4 | 58.5 | 57.7 | 55.8 | 56.2 | 56.8 | 57.0 | 56.6 | 62.4 | 61.9 | 61.5 | 60.3 | 56.4 |
| DW (nm) | 488.7 | 487.8 | 488.2 | 487.2 | 487.5 | 489.7 | 489.3 | 488.4 | 489.0 | 487.3 | 487.7 | 487.5 | 487.3 | 487.8 |
| Pe (%) | 3.9 | 5.6 | 4.8 | 5.4 | 5.6 | 4.5 | 4.6 | 5.0 | 4.7 | 4.5 | 4.3 | 4.5 | 4.8 | 5.4 |
| SC | 0.81 | 0.76 | 0.78 | 0.78 | 0.76 | 0.76 | 0.77 | 0.77 | 0.77 | 0.82 | 0.81 | 0.81 | 0.80 | 0.77 |

TABLE 3

Spectral Properties at 0.154 inches (3.9 mm)

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| LTA (%) | 71.5 | 67.1 | 68.3 | 65.7 | 65.0 | 70.6 | 68.1 | 66.4 | 68.1 | 71.2 | 71.5 | 70.6 | 69.4 | 67.6 |
| LTS (%) | 73.2 | 69.2 | 70.2 | 67.6 | 66.9 | 72.5 | 69.9 | 68.3 | 70.0 | 72.9 | 73.2 | 72.3 | 71.2 | 69.6 |
| TSUV (%) | 50.4 | 49.0 | 47.2 | 46.4 | 44.9 | 49.0 | 44.2 | 43.4 | 45.5 | 53.5 | 53.3 | 52.3 | 51.4 | 49.2 |
| TSIR (%) | 29.4 | 20.1 | 24.8 | 24.6 | 21.6 | 20.2 | 22.4 | 23.4 | 22.0 | 30.2 | 29.1 | 28.8 | 27.2 | 21.4 |
| TSET (%) | 48.8 | 41.9 | 44.9 | 43.9 | 41.8 | 43.0 | 43.1 | 43.2 | 43.1 | 49.4 | 48.9 | 48.3 | 46.9 | 42.8 |
| DW (nm) | 488.5 | 487.6 | 488.0 | 487.0 | 487.3 | 489.6 | 489.2 | 488.3 | 488.9 | 487.1 | 487.5 | 487.3 | 487.1 | 487.6 |
| Pe (%) | 6.7 | 9.5 | 8.1 | 9.2 | 9.5 | 7.7 | 7.8 | 8.4 | 8.1 | 7.7 | 7.4 | 7.7 | 8.3 | 9.1 |
| SC | 0.70 | 0.64 | 0.67 | 0.66 | 0.64 | 0.65 | 0.65 | 0.65 | 0.65 | 0.71 | 0.70 | 0.70 | 0.69 | 0.65 |

TABLE 4

Spectral Properties at 0.223 inches (5.5 mm)

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| LTA (%) | 64.2 | 58.6 | 60.1 | 56.8 | 55.9 | 63.0 | 59.7 | 57.6 | 59.8 | 63.8 | 64.2 | 63.0 | 61.5 | 59.2 |
| LTS (%) | 66.3 | 61.2 | 62.4 | 59.1 | 58.4 | 65.4 | 62.1 | 60.0 | 62.2 | 66.0 | 66.4 | 65.2 | 63.8 | 61.7 |
| TSUV (%) | 41.9 | 40.4 | 38.4 | 37.2 | 35.9 | 40.4 | 35.2 | 34.4 | 36.6 | 45.4 | 45.1 | 44.0 | 43.0 | 40.6 |
| TSIR (%) | 18.1 | 10.6 | 14.3 | 14.1 | 11.8 | 10.8 | 12.4 | 13.2 | 12.1 | 18.8 | 17.9 | 17.6 | 16.3 | 11.6 |
| TSET (%) | 39.3 | 32.8 | 35.4 | 34.1 | 32.3 | 34.3 | 33.8 | 33.5 | 33.8 | 40.0 | 39.4 | 38.8 | 37.4 | 33.6 |
| DW (nm) | 488.4 | 487.4 | 487.9 | 486.8 | 487.1 | 489.5 | 489.1 | 488.1 | 488.8 | 486.9 | 487.4 | 487.2 | 487.0 | 487.4 |
| Pe (%) | 9.6 | 13.5 | 11.6 | 13.1 | 13.4 | 10.9 | 11.1 | 12.0 | 11.4 | 10.9 | 10.6 | 11.0 | 11.8 | 13.0 |
| SC | 0.62 | 0.57 | 0.59 | 0.58 | 0.56 | 0.58 | 0.57 | 0.57 | 0.57 | 0.63 | 0.62 | 0.62 | 0.60 | 0.57 |

TABLE 5

Glass Composition

|  | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|
| Total Iron (wt. %) | 0.530 | 0.600 | 0.650 | 0.689 | 0.710 | 0.710 | 0.710 | 0.851 | 0.900 | 1.000 | 1.100 |
| $Fe_2O_3$ (wt. %) | 0.342 | 0.407 | 0.448 | 0.459 | 0.481 | 0.481 | 0.481 | 0.567 | 0.580 | 0.700 | 0.709 |
| FeO (wt. %) | 0.170 | 0.174 | 0.182 | 0.207 | 0.206 | 0.206 | 0.206 | 0.255 | 0.288 | 0.270 | 0.352 |
| Redox | 0.320 | 0.290 | 0.280 | 0.300 | 0.290 | 0.290 | 0.290 | 0.300 | 0.320 | 0.270 | 0.320 |
| CoO (PPM) | 25 | 25 | 35 | 20 | 20 | 20 | 20 | 25 | 18 | 40 | 26 |
| $Cr_2O_3$ (PPM) | 5 | 50 | 50 | 5 | 5 | 5 | 5 | 5 | 50 | 5 | 50 |

TABLE 6

Spectral Properties at 0.089 inches (2.3 mm)

| | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|
| LTA (%) | 79.5 | 78.6 | 76.6 | 78.6 | 78.6 | 78.6 | 78.6 | 75.9 | 76.0 | 72.7 | 71.9 |
| LTS (%) | 80.5 | 79.7 | 77.7 | 79.7 | 79.7 | 79.7 | 79.7 | 77.2 | 77.3 | 74.1 | 73.5 |
| TSUV (%) | 65.5 | 62.7 | 61.1 | 60.8 | 60.0 | 60.0 | 59.9 | 57.0 | 56.7 | 52.9 | 52.8 |
| TSIR (%) | 50.0 | 49.2 | 47.8 | 44.0 | 44.0 | 44.0 | 44.0 | 37.1 | 33.2 | 35.3 | 26.7 |
| TSET (%) | 63.9 | 62.9 | 61.3 | 60.0 | 60.0 | 60.0 | 60.0 | 55.1 | 52.9 | 52.7 | 47.5 |
| DW (nm) | 486.4 | 488.5 | 487.3 | 488.8 | 488.6 | 488.6 | 488.8 | 488.2 | 488.8 | 487.5 | 489.1 |
| Pe (%) | 4.4 | 4.0 | 4.8 | 4.3 | 4.1 | 4.1 | 4.0 | 5.2 | 5.4 | 6.1 | 6.7 |
| Sc | 0.83 | 0.82 | 0.811 | 0.79 | 0.79 | 0.79 | 0.79 | 0.75 | 0.73 | 0.73 | 0.69 |

TABLE 7

Spectral Properties at 0.154 inches (3.9 mm)

| | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|
| LTA (%) | 71.9 | 70.5 | 67.4 | 70.6 | 70.5 | 70.5 | 70.5 | 66.5 | 66.5 | 61.7 | 60.6 |
| LTS (%) | 73.3 | 72.1 | 69.1 | 72.3 | 72.2 | 72.2 | 72.1 | 68.4 | 68.6 | 63.7 | 63.0 |
| TSUV (%) | 56.2 | 52.7 | 50.7 | 50.3 | 49.4 | 49.3 | 49.2 | 45.7 | 45.2 | 40.7 | 40.4 |
| TSIR (%) | 32.6 | 31.8 | 30.3 | 26.3 | 26.4 | 26.4 | 26.4 | 19.9 | 16.6 | 18.3 | 11.7 |
| TSET (%) | 51.2 | 49.8 | 47.8 | 46.8 | 46.8 | 46.8 | 46.8 | 41.5 | 39.5 | 38.6 | 34.1 |
| DW (nm) | 486.2 | 488.3 | 487.1 | 488.2 | 488.5 | 488.5 | 488.6 | 488.0 | 488.7 | 487.3 | 488.9 |
| Pe (%) | 7.5 | 6.8 | 8.2 | 7.2 | 7.0 | 7.0 | 6.9 | 8.9 | 9.1 | 10.4 | 11.2 |
| Sc | 0.72 | 0.71 | 0.69 | 0.68 | 0.68 | 0.68 | 0.68 | 0.64 | 0.62 | 0.61 | 0.57 |

TABLE 8

Spectral Properties at 0.223 inches (5.5 mm)

| | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|
| LTA (%) | 64.5 | 62.8 | 58.9 | 62.9 | 62.8 | 62.8 | 62.8 | 57.7 | 57.9 | 51.9 | 50.7 |
| LTS (%) | 66.6 | 64.8 | 61.0 | 65.1 | 65.0 | 65.0 | 64.9 | 60.1 | 60.4 | 54.3 | 53.5 |
| TSUV (%) | 48.5 | 44.5 | 42.2 | 41.9 | 40.8 | 40.8 | 40.6 | 36.7 | 36.3 | 31.5 | 31.1 |
| TSIR (%) | 20.9 | 20.1 | 18.8 | 15.5 | 15.6 | 15.6 | 15.6 | 10.5 | 8.2 | 9.4 | 5.1 |
| TSET (%) | 41.6 | 40.0 | 37.8 | 37.4 | 37.3 | 37.3 | 37.3 | 32.3 | 30.9 | 29.2 | 25.8 |
| DW (nm) | 486.0 | 488.2 | 487.0 | 488.0 | 488.4 | 488.4 | 488.5 | 487.9 | 488.6 | 487.1 | 488.8 |
| Pe (%) | 10.7 | 9.7 | 11.6 | 10.3 | 10.0 | 10.0 | 9.8 | 12.6 | 12.8 | 14.7 | 15.7 |
| SC | 0.64 | 0.63 | 0.61 | 0.60 | 0.60 | 0.60 | 0.60 | 0.56 | 0.55 | 0.53 | 0.50 |

Referring to Tables 1 to 8, the present invention provides a blue colored glass using a standard soda-lime-silica glass base composition and additionally iron and cobalt, and optionally chromium, as infrared and ultraviolet radiation absorbing materials and colorants. In particular, the infrared and ultraviolet radiation absorbing and colorant portion of the glass includes about 0.53 to 1.1 wt. % total iron, preferably about 0.60 to 0.85 wt. % total iron, and about 5 to 40 PPM CoO, preferably about 15 to 30 PPM CoO. In addition, the composition may include up to 100 PPM $Cr_2O_3$, preferably 25 to 50 PPM. The glass has a redox of about 0.25 to 0.35, preferably from about 0.28 to 0.33 and a luminous transmittance (LTA) of at least 55%. In the present invention, it is important that the glass have a dominant wavelength of between about 485 to 491 nm, preferably about 487 to 489 nm, and an excitation purity of about 3 to 18%. It should be appreciated that excitation purity depends on glass thickness. As a result, it is preferred that glass of the present invention having a thickness of about 0.084 to 0.126 inches (2.1 to 3.2 mm) have a Pe of about 3 to 8%; a thickness of about 0.126 to 0.189 inches (3.2 to 4.9 mm) have a Pe of about 5 to 12%; and a thickness of about 0.189 to 0.315 inches (4.9 to 8 mm) have a Pe of about 10 to 18%.

Glass compositions as disclosed herein and made by the float process typically range from a sheet thickness of about 1 millimeter to 10 millimeters. For the vehicle glazing applications, it is preferred that the glass sheets having a composition as disclosed herein have a thickness within the range of 0.071 to 0.197 inches (1.8 to 5 mm). It is anticipated that when using a single glass ply, the glass will be tempered, e.g. for an automotive side or rear window, and when multiple plies are used, the glass will be annealed and laminated together using a thermoplastic adhesive, e.g. an automobile windshield which laminates two annealed glass plies together using a polyvinyl butyral interlayer. In addition, when the glass is used in selected areas of a motor vehicle, e.g. the windshield and front door windows and in some instances the rear window, it is required that the glass have an LTA of at least 70%. In addition, the glass compositions disclosed in the present invention should have a TSUV of no greater than 60%, preferably no greater than 50%, a TSIR of no greater than about 35%, preferably no greater than about 30%, and a TSET of no greater than about 55%, preferably, no greater than about 50% at a thickness of about 0.154 inches.

In architectural glazing applications, there is generally no legal requirement with respect to solar transmittance (LTS) of the glass; however in the present invention, it is preferred that the glass have an LTS of about 60 to 70%, preferably about 63 to 67% and a shading coefficient of no greater than about 0.70, and preferably no greater than about 0.65 at a thickness of about 0.223 inches.

It is expected that the spectral properties of the glass will change after tempering the glass and further upon prolonged exposure to ultraviolet radiation, commonly referred to as solarization. In particular, it is estimated that tempering and solarization of the glass compositions disclosed herein will reduce LTA, LTS and TSIR by about 0.5 to 1%, reduce the TSUV by about 1 to 2%, and TSET by about 1 to 1.5%. As a result, in one embodiment of the invention, the glass composition has selected spectral properties that initially fall outside the desired ranges previously discussed but fall within the desired ranges after tempering and/or solarization.

It should also be appreciated that since the luminous and solar transmittance (LTA and LTS) is reduced by these conditions, in order to maintain the transmittance above a desired minimum level, the initial LTA or LTS of the glass after production should be sufficiently high so that any losses attributable to tempering and solarization will not reduce the transmittance to an unacceptable level.

As discussed earlier, other materials may also be added to the glass compositions disclosed herein to further reduce infrared and ultraviolet radiation transmission and/or control glass color. Inclusion of chromium and manganese has been discussed earlier. It is contemplated that the following materials may also be added to the iron and cobalt containing soda-lime-silica glass disclosed herein:

| | |
|---|---|
| $SnO_2$ | 0 to about 2.0 wt. % |
| $CeO_2$ | 0 to about 1.0 wt. % |
| $TiO_2$ | 0 to about 0.5 wt. % |
| ZnO | 0 to about 0.5 wt. % |
| $Nd_2O_3$ | 0 to about 0.5 wt. % |
| $MoO_3$ | 0 to about 100 PPM |
| $V_2O_5$ | 0 to about 75 PPM |
| NiO | 0 to about 10 PPM |
| Se | 0 to about 3 PPM |

As should be appreciated, adjustment may have to be made to the basic constituents of the glass to account for any coloring and/or redox affecting power of these additional materials.

Other variations as are known to those of skill in the art may be resorted to without departing from the scope of the invention as defined by the claims that follow.

We claim:

1. A blue colored, infrared and ultraviolet radiation absorbing glass composition having a base glass portion comprising:

$SiO_2$ about 66 to 75 percent by weight
$Na_2O$ about 10 to 20 percent by weight
CaO about 5 to 15 percent by weight
MgO 0 to about 5 percent by weight
$Al_2O_3$ 0 to about 5 percent by weight
$K_2O$ 0 to about 5 percent by weight and a solar radiation absorbing and colorant portion consisting essentially of:

total iron about 0.53 to 1.1 percent by weight
CoO about 5 to 40 PPM
$Cr_2O_3$ 0 to about 100 PPM, the glass having a redox of about 0.25 to 0.35, a luminous transmittance of at least 55%, and a color characterized by a dominant wavelength of 485 to 489 nanometers and an excitation purity of about 3 to 18 percent.

2. The composition as in claim 1 wherein the total iron concentration is from about 0.6 to 0.85 weight percent and the redox is from about 0.28 to 0.33.

3. The composition as in claim 2 wherein the CoO concentration is from about 15 to 30 PPM.

4. The composition as in claim 3 wherein the color of the glass is characterized by a dominant wavelength in the range of 487 to 489 nanometers and an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

5. The composition as in claim 4 wherein the glass has a luminous transmittance of about 70 percent or greater.

6. The composition as in claim 4 wherein the glass has a solar transmittance of about 60 to 70 percent and a shading coefficient of about 0.70 or less.

7. The composition as in claim 1 wherein the CoO concentration is from about 15 to 30 PPM.

8. The composition as in claim 1 wherein the $Cr_2O_3$ concentration is from about 25 to 50 PPM.

9. The composition as in claim 1 wherein the glass has a luminous transmittance of about 70 percent or greater.

10. The composition as in claim 9 wherein the glass has a total solar ultraviolet transmittance of about 60 percent or less, a total solar infrared transmittance of about 35 percent or less and a total solar energy transmittance of about 55 percent or less at a thickness of about 0.154 inches.

11. The composition as in claim 10 wherein the glass has a total solar ultraviolet transmittance of about 50 percent or less, a total solar infrared transmittance of about 30 percent or less and a total solar energy transmittance of about 50 percent or less at a thickness of about 0.154 inches.

12. The composition as in claim 1 wherein the glass has a solar transmittance of about 60 to 70 percent and a shading coefficient of about 0.70 or less at a thickness of about 0.223 inches.

13. The composition as in claim 12 wherein the glass has a solar transmittance of about 63 to 67 percent and a shading coefficient of about 0.65 or less at a thickness of about 0.223 inches.

14. The composition as in claim 1 wherein the color of the glass is characterized by a dominant wavelength in the range of 487 to 489 nanometers.

15. The composition as in claim 1 wherein the color of the glass is characterized by an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

16. A glass sheet made from the composition as recited in claim 1.

17. The glass sheet as in claim 16 wherein the sheet has a thickness between 1.8 to 10 mm.

18. A blue colored, infrared and ultraviolet radiation absorbing glass composition having a base glass portion comprising:

$SiO_2$ about 66 to 75 percent by weight

Na$_2$O about 10 to 20 percent by weight

CaO about 5 to 15 percent by weight

MgO 0 to about 5 percent by weight

Al$_2$O$_3$ 0 to about 5 percent by weight

K$_2$O 0 to about 5 percent by weight and a solar radiation absorbing and colorant portion consisting essentially of:

total iron about 0.53 to 1.1 percent by weight

CoO about 5 to 40 PPM

SnO$_2$ 0 to about 2.0 percent by weight

CeO$_2$ 0 to about 1.0 percent by weight

TiO$_2$ 0 to about 0.5 percent by weight

ZnO 0 to about 0.5 percent by weight

Nd$_2$O$_3$ 0 to about 0.5 percent by weight

MnO$_2$ 0 to about 0.1 percent by weight

MoO$_3$ 0 to about 100 PPM

Cr$_2$O$_3$ 0 to about 100 PPM,

V$_2$O$_5$ 0 to about 75 PPM

NiO 0 to about 10 PPM

Se 0 to about 3 PPM the glass having a redox of about 0.25 to 0.35, a luminous transmittance of at least 55%, and a color characterized by a dominant wavelength of 485 to 489 nanometers and an excitation purity of about 3 to 18 percent.

19. The composition as in claim 18 wherein the color of the glass is characterized by a dominant wavelength in the range of 487 to 489 nanometers and an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

20. A blue colored, infrared and ultraviolet radiation absorbing glass composition having a base glass portion comprising:

SiO$_2$ about 66 to 75 percent by weight

Na$_2$O about 10 to 20 percent by weight

CaO about 5 to 15 percent by weight

MgO 0 to about 5 percent by weight

Al$_2$O3 0 to about 5 percent by weight

K$_2$O 0 to about 5 percent by weight and a solar radiation absorbing and colorant portion consisting essentially of:

total iron about 0.53 to 1.1 percent by weight

CoO about 5 to 40 PPM

Cr$_2$O$_3$ 0 to about 100 PPM, the glass having a redox of about 0.25 to 0.35, a luminous transmittance of at least 65% at a thickness of 3.9 mm, and a color characterized by a dominant wavelength of about 485 to 491 nanometers and an excitation purity of about 3 to 18 percent.

21. The composition as in claim 20 wherein the total iron concentration is from about 0.6 to 0.85 weight percent and the redox is from about 0.28 to 0.33.

22. The composition as in claim 21 wherein the CoO concentration is from about 15 to 30 PPM.

23. The composition as in claim 22 wherein the color of the glass is characterized by a dominant wavelength in the range of about 487 to 489 nanometers and an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

24. The composition as in claim 23 wherein the glass has a luminous transmittance of about 70 percent or greater.

25. The composition as in claim 23 wherein the glass has a solar transmittance of about 60 to 70 percent and a shading coefficient of about 0.70 or less.

26. The composition as in claim 20 wherein the CoO concentration is from about 15 to 30 PPM.

27. The composition as in claim 20 wherein the Cr$_2$O$_3$ concentration is from about 25 to 50 PPM.

28. The composition as in claim 20 wherein the glass has a luminous transmittance of about 70 percent or greater.

29. The composition as in claim 28 wherein the glass has a total solar ultraviolet transmittance of about 60 percent or less, a total solar infrared transmittance of about 35 percent or less and a total solar energy transmittance of about 55 percent or less at a thickness of about 0.154 inches.

30. The composition as in claim 29 wherein the glass has a total solar ultraviolet transmittance of about 50 percent or less, a total solar infrared transmittance of about 30 percent or less and a total solar energy transmittance of about 50 percent or less at a thickness of about 0.154 inches.

31. The composition as in claim 20 wherein the glass has a solar transmittance of about 60 to 70 percent and a shading coefficient of about 0.70 or less at a thickness of about 0.223 inches.

32. The composition as in claim 31 wherein the glass has a solar transmittance of about 63 to 67 percent and a shading coefficient of about 0.65 or less at a thickness of about 0.223 inches.

33. The composition as in claim 20 wherein the color of the glass is characterized by a dominant wavelength in the range of about 487 to 489 nanometers.

34. The composition as in claim 20 wherein the color of the glass is characterized by an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

35. A glass sheet made from the composition as recited in claim 20.

36. The glass sheet as in claim 35 wherein the sheet has a thickness between 1.8 to 10 mm.

37. A blue colored, infrared and ultraviolet radiation absorbing glass composition having a base glass portion comprising:

SiO$_2$ about 66 to 75 percent by weight

Na$_2$O about 10 to 20 percent by weight

CaO about 5 to 15 percent by weight

MgO 0 to about 5 percent by weight

Al$_2$O$_3$ 0 to about 5 percent by weight

K$_2$O 0 to about 5 percent by weight and a solar radiation absorbing and colorant portion consisting essentially of:

total iron about 0.53 to 1.1 percent by weight

CoO about 5 to 40 PPM

SnO$_2$ 0 to about 2.0 percent by weight

CeO$_2$0 to about 1.0 percent by weight

TiO$_2$ 0 to about 0.5 percent by weight

ZnO 0 to about 0.5 percent by weight

Nd$_2$O$_3$ 0 to about 0.5 percent by weight

MnO$_2$ 0 to about 0.1 percent by weight

MoO$_3$ 0 to about 100 PPM $Cr_2O_3$ 0 to about 100 PPM,
$V_2O_5$ 0 to about 75 PPM
NiO 0 to about 10 PPM
Se 0 to about 3 PPM
the glass having a redox of about 0.25 to 0.35, a luminous transmittance of at least 65% at a thickness of 3.9 mm, and a color characterized by a dominant wavelength of about 485 to 491 nanometers and an excitation purity of about 3 to 18 percent.

38. The composition as in claim 37 wherein the color of the glass is characterized by a dominant wavelength in the range of about 487 to 489 nanometers and an excitation purity of about 3 to 8 percent at a thickness of about 0.084 to 0.126 inches, an excitation purity of about 5 to 12 percent at a thickness of about 0.126 to 0.189 inches, and an excitation purity of about 10 to 18 percent at a thickness of about 0.189 to 0.315 inches.

* * * * *